C. F. F. ALLAN.
BAKER'S OVEN.
APPLICATION FILED MAY 2, 1917.
1,239,246.
Patented Sept. 4, 1917.
2 SHEETS—SHEET 1.
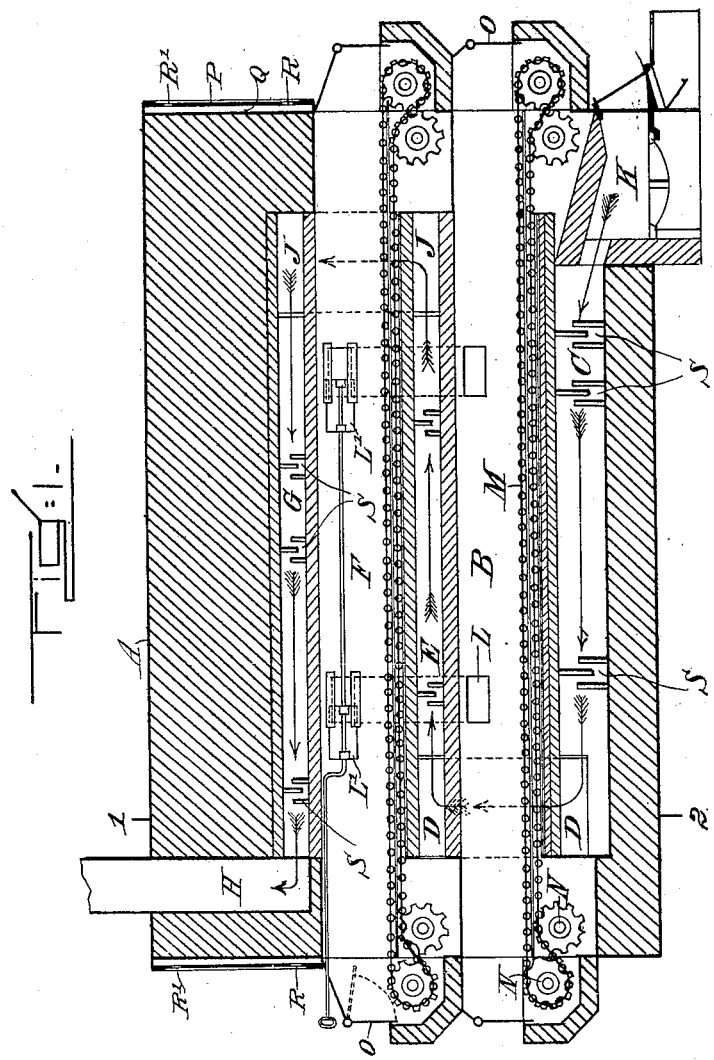
Inventor
Charles Frederick Fox Allan C. F. F. ALLAN.
BAKER'S OVEN.
APPLICATION FILED MAY 2, 1917.
1,239,246.
Patented Sept. 4, 1917.
2 SHEETS—SHEET 2.
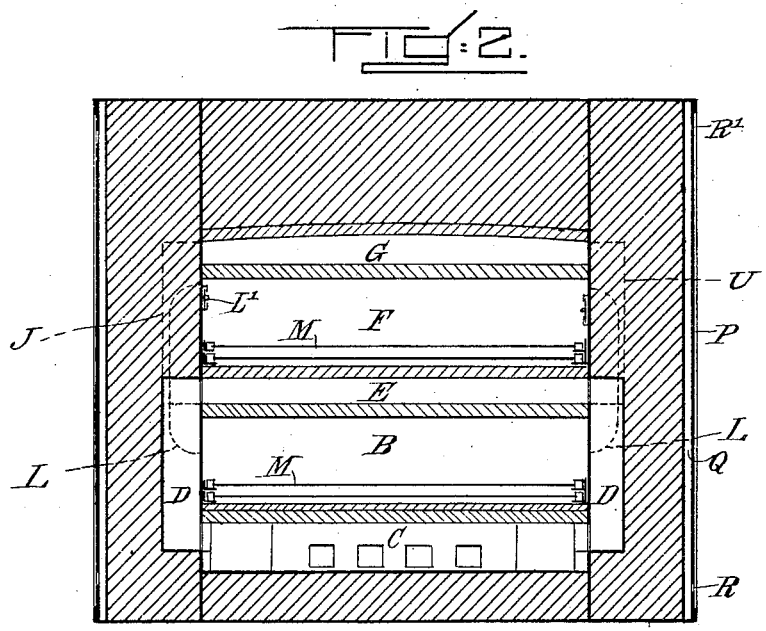
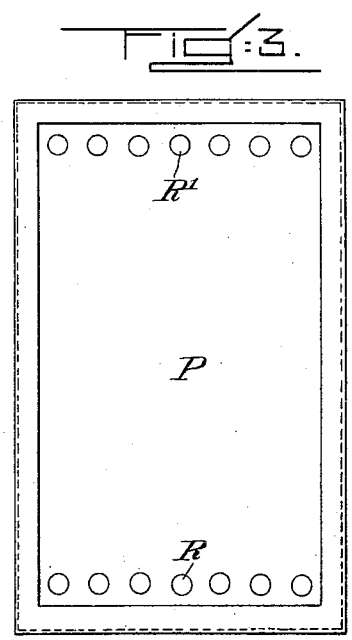
Inventor
Charles Frederick Fox Allan
Attorney.

UNITED STATES PATENT OFFICE.

CHARLES FREDERICK FOX ALLAN, OF SYDNEY, NEW SOUTH WALES, AUSTRALIA.

BAKER'S OVEN.

1,239,246.   Specification of Letters Patent.   Patented Sept. 4, 1917.

Application filed May 2, 1917. Serial No. 166,048.

*To all whom it may concern:*

Be it known that I, CHARLES FREDERICK FOX ALLAN, subject of the King of Great Britain and Ireland, residing at 123–131 Castlereagh street, Sydney, New South Wales, Australia, have invented new and useful Improvements in Bakers' Ovens, of which the following is a specification.

In this invention there are several new features, designed with a view to more economical working, and incidentally to prevent the heat radiating from the oven, into the bakehouse, with the consequent discomfort to those employed therein.

The products of combustion will pass from the firebox to a chamber occupying the full space below the baking chamber. At the two corners are flues that convey the products of combustion from the lower chamber to a similar chamber above the baking chamber, and thence to the front of the oven to flues leading to a common uptake, or to the upper heating chamber of the oven next above, and thence to the uptake. The heating chamber may be provided with guiding or baffle plates so arranged that the heated products of combustion will be caused to take a serpentine course and this will insure that the oven shall be uniformly heated. The floor and the oven chamber will be covered with fire bricks and tiles in a manner that is well known to the trade. Flues will also be arranged connecting a lower oven with the oven next above for the purpose of equalizing the temperature in the baking chambers.

In place of the ordinary draw plate an endless horizontal traveling chain plate will be provided, the chain of which will be composed of a number of metal slats. This traveling chain plate will be actuated by chain and sprocket gear. The extreme ends of the traveling chain plate will project beyond the doors at each end of the oven for convenience of handling the bread when loading or unloading the oven. The sprockets will be placed in such a position that the traveling chain plate will revolve within the oven chamber close to and parallel with the floor of the oven.

Wherever possible, an air space will be arranged on the outside of the casing that is filled with sand. This air space will consist of a number of vertical compartments with holes through which air can enter the air space at the bottom, and holes through which the heated air can escape at the top.

But in order that the invention may be properly understood, reference will hereinafter be made to the accompanying sheets of drawings, in which:—

Figure 1 is a longitudinal vertical section of the improved baker's oven.

Fig. 2 is a transverse section of the same, the section being taken on the line 1—2 of Fig. 1.

Fig. 3 is an elevation of one of the panels of the false sides, showing the apertures for the ingress and egress of the outer air to and from the air spaces, as specified.

The drawing shows a construction in which there are two baking chambers or ovens, the upper heating chamber of the lower oven acting as the lower heating chamber to the oven next above. A is the casing packed with sand to diminish radiation, in a manner that is well understood; B is the lower baking chamber or oven, beneath which is a heating chamber C that communicates, through the flue D, with the top heating chamber E; the upper baking chamber or oven is shown at F, the heating chamber E serving also as lower heating chamber to the top oven F; above the top oven F is the upper heating chamber G, which, in this case, leads direct to the uptake H. The heating chamber E is connected to the heating chamber G through the flue J. The fire-box is shown at K, the products of combustion therefrom following the lines indicated by the arrows. The heating chambers may be provided with the baffles S. In order that the temperatures of the two ovens may be equalized they will be connected together by a side hot air passage, or passages, L, which will be provided with a damper, or dampers $L^1$, whereby all connection may be severed between the two ovens, in which case the temperature in both would not be equalized.

Instead of the floors of the ovens being provided with draw-plates, as is usual, the draw-plates in this case will be superseded by endless chains M which will be worked by sprockets N that may be operated from the outside in any suitable and convenient manner. The sprockets N will lie outside the ovens, which will be closed by doors O at both ends. The chain plates will travel as near the floors of the ovens as is convenient.

Outside the casing A, that contains the sand packing, will be another casing P arranged in panels, so there shall be a number of perpendicular air chambers Q separated by partitions from one another. Each panel will have one or more holes or perforations R near its bottom end, for the admission of air, and similar holes or perforations R¹ near its top end. This arrangement has been adopted with a view to intercept the heat which would radiate from the heated sand within the casing A, and prevent it from entering the bake-house to the inconvenience of the man working therein.

I claim—

In a baker's oven, the combination of a lower oven, an upper oven, a fire box, a first heating chamber below the lower oven communicating at one end with the fire box, a second heating chamber above the lower oven and below the upper oven, a third heating chamber above the upper oven, an uptake, flues for connecting the first heating chamber to the second heating chamber and the latter chamber to the third heating chamber and for leading the hot gases in the third heating chamber toward the uptake, the flues and heating chambers being totally out of communication with the ovens, whereby the products of combustion are kept from the interiors of the ovens but are given an unimpeded passage way from the fire box over the tops and bottoms of the two ovens toward the uptake, flues totally out of communication with the first-mentioned flues and connecting the two ovens, and damper means for the last-mentioned flues whereby the temperatures within the ovens may be equalized irrespective of variations in temperature differences between the three heating chambers; substantially as described.

In testimony whereof I have signed my name to this specification in the presence of two subscribing witnesses.

CHARLES FREDERICK FOX ALLAN.

Witnesses:
A. MASSEY,
H. C. CAMPBELL.

Copies of this patent may be obtained for five cents each, by addressing the "Commissioner of Patents, Washington, D. C."